(12) United States Patent
Lin et al.

(10) Patent No.: US 8,111,329 B2
(45) Date of Patent: Feb. 7, 2012

(54) TELEVISION RECEIVING SYSTEM

(75) Inventors: Ray-Kuo Lin, Taipei County (TW);
Kuo-Hao Chao, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 959 days.

(21) Appl. No.: 12/107,937

(22) Filed: Apr. 23, 2008

(65) Prior Publication Data
US 2009/0268094 A1    Oct. 29, 2009

(51) Int. Cl.
*H03M 1/12* (2006.01)

(52) U.S. Cl. .......... 348/572; 348/725; 341/126

(58) Field of Classification Search .......... 348/572, 348/725; 341/126
See application file for complete search history.

(56) References Cited

U.S. PATENT DOCUMENTS 5,282,023 A * 1/1994 Scarpa .......... 348/624
7,697,645 B2 * 4/2010 Jong .......... 375/346

* cited by examiner

*Primary Examiner* — Brian Pendleton
*Assistant Examiner* — Olugbenga Idowu
(74) *Attorney, Agent, or Firm* — Thomas|Kayden

(57) ABSTRACT

A television receiving system is disclosed, comprising an input terminal, a down-converter, an amplifier, an analog-to-digital converter (ADC), a demodulator, and an isolation circuit. The input terminal receives an RF signal. The down*converter, coupled to the input terminal, converts the RF signal to an intermediate frequency (IF) signal. The amplifier, coupled to the down-converter, amplifies the IF signal. The analog-to-digital converter, coupled to the amplifier, converts the amplified IF signal to digital data. The demodulator, coupled to the ADC, processes the digital data to generate baseband data. The isolation circuit, coupled between the amplifier and ADC, isolates the amplified IF signal from being affected by interference induced by the ADC.

13 Claims, 2 Drawing Sheets

TELEVISION RECEIVING SYSTEM

BACKGROUND OF THE INVENTION

1. Field of the Invention

The invention relates in general to television receiving systems, and in particular, to an analog TV receiving system with a digitized analog TV demodulator.

2. Description of the Related Art

A television (TV) includes a television receiver to receive terrestrial broadcast, cable or satellite broadcast television signals and to process the television signals into appropriate video signals for display and audio signals for hearing. Television signals are transmitted in analog or digital formats and in accordance with a variety of standards. The NTSC (National Television Standards Committee) standard, the PAL (Phase Alternate Lines) standard, and the SECAM (Sequential Couleur Avec Memoire) standard are widely adopted for analog TVs, and the DVB (Digital Video Broadcast) format and the ATSC (Advanced Television Standards Committee) standards are employed for digital TVs. Because different television formats and standards are incompatible with one another, television receivers are traditionally made specifically for the analog or digital format and for a specific standard. Television receivers are dedicated to being used in the geographic region in which the television standard is being broadcasted.

Conventional television receivers, for both analog and digital TVs, receive an incoming television signal in radio frequency (RF) and convert the RF to an intermediate frequency (IF) signal by using an IF downconverter. The IF signal is filtered, amplified, and demodulated by a predetermined television signal format and standard. For analog television signals, the demodulator used is a VIF/SIF module, providing a video output such as a CVBS (Composite Video Baseband Signal) and an audio output such as an MPX or A2. For digital television signals, the demodulator employs an analog-to-digital converter and other supporting circuitry to perform demodulation to output display and audio information to a digital TV.

BRIEF SUMMARY OF THE INVENTION

A detailed description is given in the following embodiments with reference to the accompanying drawings.

A television receiving system is disclosed, comprising an input terminal, a down-converter, an amplifier, an analog-to-digital converter (ADC), a demodulator, and an isolation circuit. The input terminal receives an RF signal. The down-converter, coupled to the input terminal, converts the RF signal to an intermediate frequency (IF) signal. The amplifier, coupled to the down-converter, amplifies the IF signal. The analog-to-digital converter, coupled to the amplifier, converts the amplified IF signal to digital data. The demodulator, coupled to the ADC, processes the digital data to generate baseband data. The isolation circuit, coupled between the amplifier and the ADC, isolates the amplified IF signal from being affected by interference induced by the ADC.

According to another embodiment of the invention, a television receiving system comprises an analog front end, an analog-to-digital converter (ADC), a digital signal processor, and an isolation circuit. The analog front end outputs an analog signal. The analog-to-digital converter, coupled to the analog front end, converts the analog signal to digital data. The digital signal processor, coupled to the ADC, processes the digital data to generate baseband data. The isolation circuit, coupled between the analog front end and the ADC, isolates the analog signal from being affected by interference induced during conversion of the analog signal to digital data.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Before analog TV contents or analog TV applications are completely fade out from the market, TVs capable of receiving and processing analog TV signals are still in demand. In order to reduce design and manufacturing costs for television receivers, a digitized demodulator is incorporated into the design of an analog TV receiver. However, when an analog-to-digital converter (ADC) of the digitized demodulator is integrated into the analog TV receiver circuitry, clock harmonic interference is induced from a sample and hold circuit of the ADC, which degrades signal quality, reduces the signal to noise ratio (SNR) and disrupts operations of the analog circuit. An exemplary design of the present invention disposes an isolation circuit at a front end of the TV receiver to isolate the TV signal trace from interference coupling induced by the ADC circuitry.

Figure 1:
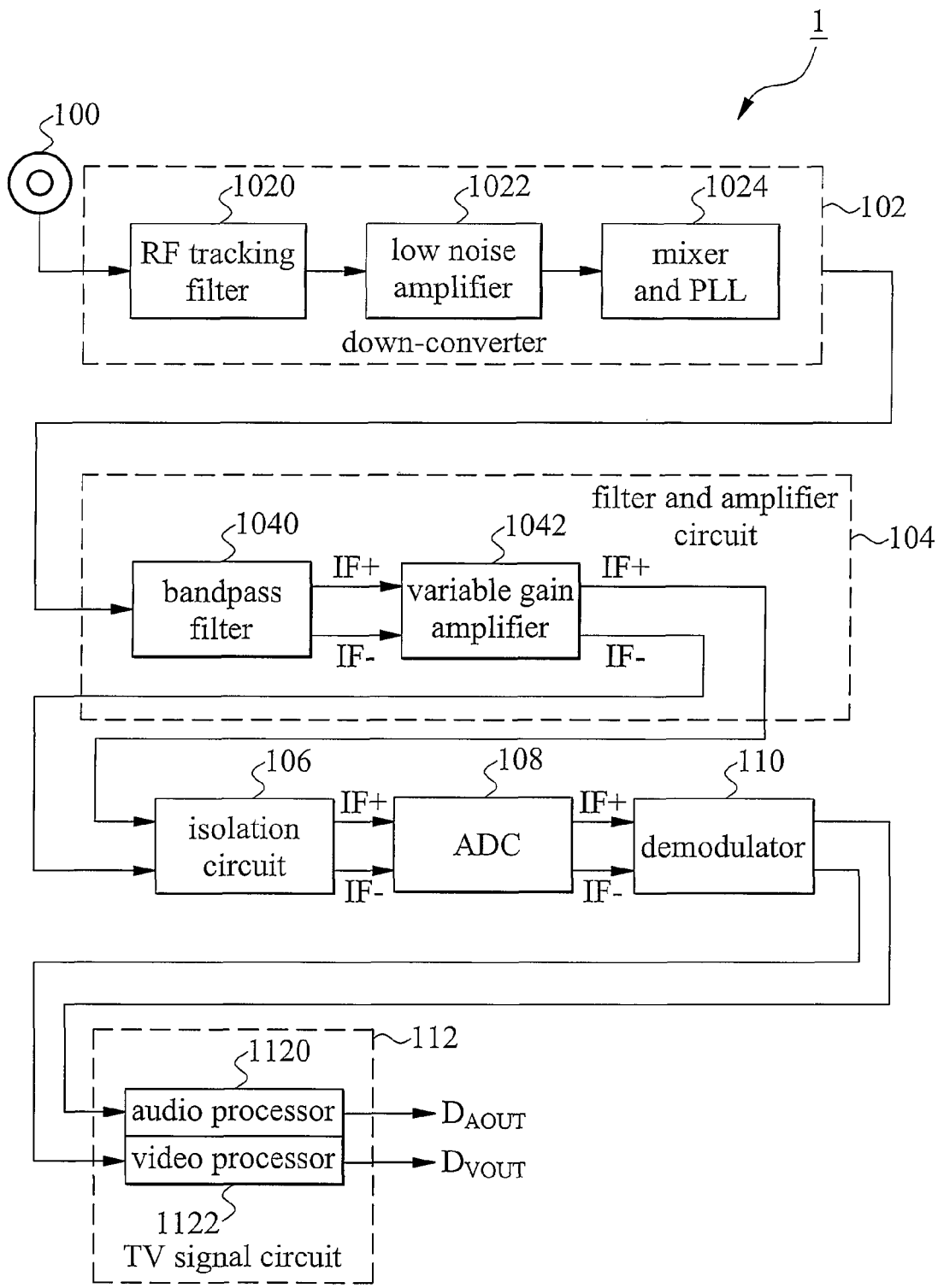
FIG. 1 is a block diagram of an exemplary TV receiver according to an embodiment of the invention.

FIG. 1 is a block diagram of an exemplary TV receiver according to an embodiment of the invention, comprising an input terminal 100, a down-converter 102, a filter and amplifier circuit 104, an isolation circuit 106, an analog-to-digital converter 108, a demodulator 110, and a TV signal processor 112. The input terminal 100 is coupled to the down-converter 102, the amplifier 104, the isolation circuit 106, the analog-to-digital converter 108, the demodulator 110, and subsequently to the decoder 112.

The input terminal 100 receives RF signals on a channel selected by a tuner (not shown) from an antenna (not shown). The RF signals are then passed to the down-converter 102 to convert the RF signals to intermediate frequency (IF) signals, sent to the filter and amplifier circuit 104 to reject out-of-band signals and amplify the filtered IF signals. The center frequency of the IF signals for the television signals is around 30 MHz to 60 MHz. Typically, the amplified IF signals are delivered to an analog-to-digital converter 108 for data sampling at a clock rate lower than the IF frequencies of the IF signals, thus the analog-to-digital converter 108 produces clock harmonic interferences while using a sample and hold circuit to sample the IF signals, causing noises in preceding analog signals including the RF signals and IF signals. Therefore, in an embodiment of the present invention, an isolation circuit 106 is directly connected between the filter and amplifier circuit 104 and the analog-to-digital converter 108. The isolation circuit 106 passes the amplified IF signals to the analog-to-digital converter 108, and prevents interference leakage from the analog-to-digital converter 108 to affect and disrupt the RF and IF signals in the down-converter 102 and the filter and amplifier circuit 104. The analog-to-digital converter 108 subsequently converts the amplified IF signals into digital data for the digitized analog TV demodulator 110 and the TV signal processor 112 to process the digital data according to a video coding standard such as NTSC or PAL standard. The demodulator 110 and the TV signal processor 112 may be implemented in a digital signal processor (DSP). The TV signal processor 112 comprises an audio processor 1120 processing audio data and a video processor 1122 processing video data. The demodulator 110 is a digital demodulator, demodulating the digital data to generate baseband signals including video data such as Composite Video Broadcast Signal (CVBS) data to the video processor 1122 and audio data such as $2^{nd}$ sound IF (SIF) data to the audio processor 1120.

The input terminal 100 may be a single-ended terminal receiving single-ended RF signals or a differential input terminal receiving differential RF signal pairs. The down-converter 102 of the embodiment shown in FIG. 1 comprises an RF tracking filter 1020, a low noise amplifier 1042, and a mixer and PLL (phase lock loop) 1024 coupled in series. The RF tracking filter 1020 tracks the frequency of the RF signal within the radio receiver's tracking range of RF frequencies, and the low noise amplifier 1042 amplifies the RF signals of the selected channel to output the amplified RF signals for the mixer and PLL 1024 to mix with a carrier signal and generate the IF signals.

The filter and amplifier circuit 104 comprises an IF bandpass filter 1040 and a variable gain amplifier 1042 coupled thereto. The IF bandpass filter 1040 of this embodiment is a surface acoustic wave (SAW) filter filtering out out-of-band signals in the IF signals. The variable gain amplifier 1042 is capable of adjusting the magnitude of the amplified IF signals to prevent the occurrence of signal clipping. The broadcast RF signal may be a vestigial sideband ("VSB").

Figure 2:
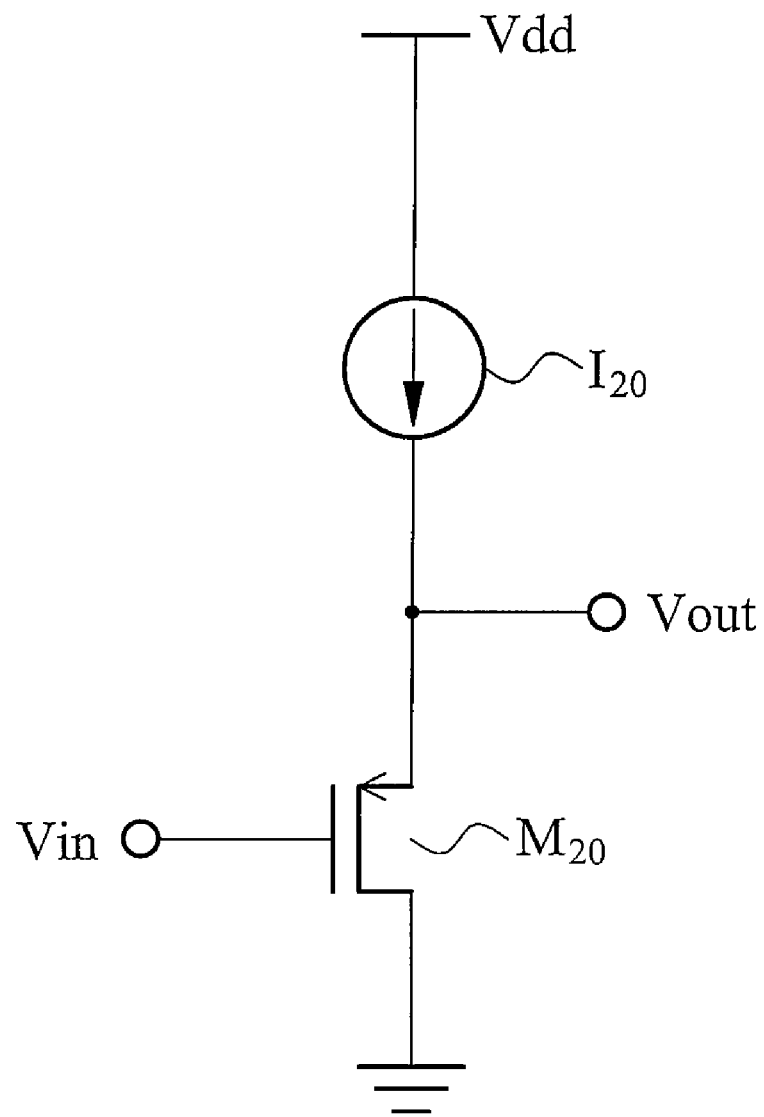
FIG. 2 shows a circuit schematic of an exemplary isolation circuit incorporated in FIG. 1.

In some embodiments, the isolation circuit 106 is a standalone or an on-chip circuit connected directly to the analog-to-digital converter 108. The isolation circuit 106 may be a buffer, a filter, or a cascade of passive components. FIG. 2 shows a circuit schematic of an exemplary isolation circuit incorporated in FIG. 1, comprising a current source I20 and a transistor M20 coupled thereto. The current source $I_{20}$ provides a constant current source for the drain current of transistor M20, which receives the amplified IF signals (Vin) from the variable gain amplifier 1042 to output a buffered signal (Vout) to the ADC. The buffer circuit of FIG. 2 isolates the clock harmonic interference of the ADC from the front-end of the TV receiver, preventing the analog signals being affected by the interference and decreasing the noise in the amplified IF signals. The isolation circuit 106 may also be a filter comprising only passive circuit components. The filter is a bandpass filter filtering out the harmonic notches of the clock interference from the ADC (for example, 60 MHz), so that the analog signals in the down-converter 102 and the filter and amplifier circuit 104 are not disrupted by the interferences. In some other embodiments, the isolation circuit contains a plurality of gain stages, which only allows signals pass in one direction while blocking the signals leaking in the opposite direction. The isolation circuit can be disposed in a separate circuitry or integrated into the same integration circuit (SoC) as the ADC.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A television receiving system, comprising:
   an input terminal, receiving an RF signal;
   a down-converter, coupled to the input terminal, converting the RF signal to an intermediate frequency (IF) signal;
   an amplifier, coupled to the down-converter, amplifying the IF signal;
   an analog-to-digital converter (ADC), coupled to the amplifier, converting the amplified IF signal to digital data;
   a demodulator, coupled to the ADC, processing the digital data to generate baseband data; and
   an isolation circuit, couple between the amplifier and ADC, isolating signal traces from being affected by interference produced by the ADC.

2. The television receiving system of claim 1, wherein the isolation circuit is a buffer.

3. The television receiving system of claim 2, wherein the buffer comprises: a current source, providing a constant current; and a transistor, coupled to the current source, receiving the amplified IF signal to
   generate a buffer output to the demodulator, so that the amplified IF signal is isolated from the interference produced by the ADC.

4. The television receiving system of claim 1, wherein the isolation circuit is a filter.

5. The television receiving system of claim 4, wherein the filter comprises passive components, filtering the amplified IF signals.

6. The television receiving system of claim 1, wherein the demodulator generates audio data and video data, and the television receiving system further comprises:
   an audio processor, coupled to the demodulator, decoding the audio data to output an audio output; and
   a video processor, coupled to the demodulator, decoding the video data to output a video output.

7. A television receiving system, comprising:
   an analog front end, outputting an analog signal;
   an analog-to-digital converter (ADC), coupled to the analog front end, converting the analog signal to digital data;
   a digital signal processor, coupled to the ADC, processing the digital data to generate baseband data; and
   an isolation circuit, coupled between the analog front end and the ADC, isolating the analog signal from being affected by interference induced by conversion of the analog signal into digital data.

8. The television receiving system of claim 7, wherein the analog front end comprises:
   an input terminal, receiving an RF signal;
   a down-converter, coupled to the input terminal, converting the RF signal to an intermediate frequency (IF) signal;
   a bandpass filter, coupled to the down-converter, filtering the IF signal; and
   an amplifier, coupled to the bandpass filter, amplifying the output of the bandpass filter to generate the analog signal.

9. The integration circuit of claim 7, wherein the isolation circuit is a buffer.

10. The integration circuit of claim 9, wherein the buffer comprises:
    a current source, providing a constant current; and
    a transistor, coupled to the current source, receiving the analog signal to generate a buffer output to the digital signal processor, so that the analog signal is isolated from the interference produced by the ADC.

11. The integration circuit of claim 7, wherein the isolation circuit is a filter.

12. The integration circuit of claim 11, wherein the filter comprises passive components, filtering the analog signal.

13. The integration circuit of claim 7, wherein the digital signal processor comprises:

a demodulator, coupled to the ADC;

an audio processor, coupled to the demodulator for processing audio data of the baseband data; and a video processor, coupled to the demodulator for processing video data of the baseband data.

* * * * *